(12) United States Patent
Burger

(10) Patent No.: US 9,371,824 B2
(45) Date of Patent: Jun. 21, 2016

(54) DOSING DEVICE

(71) Applicant: Robert Bosch GmbH, Stuttgart (DE)

(72) Inventor: Matthias Burger, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/395,621

(22) PCT Filed: Feb. 19, 2013

(86) PCT No.: PCT/EP2013/053274
§ 371 (c)(1),
(2) Date: Oct. 20, 2014

(87) PCT Pub. No.: WO2013/156178
PCT Pub. Date: Oct. 24, 2013

(65) Prior Publication Data
US 2015/0082775 A1    Mar. 26, 2015

(30) Foreign Application Priority Data
Apr. 19, 2012  (DE) .......................... 10 2012 206 481

(51) Int. Cl.
| | |
|---|---|
| *F01N 3/00* | (2006.01) |
| *F04B 17/04* | (2006.01) |
| *F01N 3/20* | (2006.01) |
| *F01N 3/025* | (2006.01) |
| *F02M 57/02* | (2006.01) |

(52) U.S. Cl.
CPC .............. *F04B 17/04* (2013.01); *F01N 3/0253* (2013.01); *F01N 3/208* (2013.01); *F01N 3/2066* (2013.01);
(Continued)

(58) Field of Classification Search
USPC ................. 60/286, 295, 297, 301, 303; 239/5, 239/132.3, 132, 585.1, 533.2, 533.12
See application file for complete search history.

(56) References Cited

U.S. PATENT DOCUMENTS

| | | | | |
|---|---|---|---|---|
| 4,984,549 | A * | 1/1991 | Mesenich | .......... F02M 51/0625 |
| | | | | 123/472 |
| 6,539,708 | B1 * | 4/2003 | Hofmann | ........... B01D 53/8631 |
| | | | | 239/132.3 |
| 6,719,224 | B2 * | 4/2004 | Takeuchi | ............. B60H 1/3205 |
| | | | | 239/533.9 |

(Continued)

FOREIGN PATENT DOCUMENTS

| | | |
|---|---|---|
| DE | 19542914 | 6/1996 |
| DE | 102008013440 | 9/2009 |
| DE | 102011078852 | 1/2013 |

OTHER PUBLICATIONS

International Search Report for Application No. PCT/EP2013/053274 dated Apr. 3, 2013 (English Translation, 2 pages).

*Primary Examiner* — Binh Q Tran
(74) *Attorney, Agent, or Firm* — Michael Best & Friedrich LLP

(57) ABSTRACT

The present invention relates to a dosing valve and to a dosing device (15) for introducing a liquid medium into an exhaust-gas stream of an internal combustion engine (1) of a motor vehicle. The dosing device (15) has a pump (23) for delivering the liquid medium. The medium is injected into the exhaust-gas stream by means of a dosing valve (13) which can be controlled by way of an electromagnet (65). The dosing device (13) comprises a housing (33) with a stepped bore (34, 34.1, 34.2, 34.3, 34.4), wherein a pump sleeve (47) is guided sealingly in one portion (34.4) of the stepped bore (34). A hollow-bored piston (49) is guided sealingly in a central bore (48) of the pump sleeve (47). In a low-pressure chamber (61), an armature (69) is fastened to the piston (49), and furthermore a magnet sleeve (67) is fastened to the housing (33). A stop sleeve (75) is arranged on a side of the low-pressure chamber (61) situated opposite the magnet sleeve (67), wherein a stroke of the piston (49) is limited by the magnet sleeve (67) and/or by the stop sleeve (75).

16 Claims, 2 Drawing Sheets

(52) U.S. Cl.
CPC ........... *F04B 17/046* (2013.01); *F01N 2610/02* (2013.01); *F01N 2610/1433* (2013.01); *F01N 2610/1453* (2013.01); *F02M 57/027* (2013.01); *Y02T 10/24* (2013.01)

(56) References Cited

U.S. PATENT DOCUMENTS

| | | | |
|---|---|---|---|
| 7,303,144 B2 * | 12/2007 | Alyanak | F01N 11/002 239/533.12 |
| 7,467,749 B2 * | 12/2008 | Tarabulski | F01N 3/2066 239/132 |
| 8,225,602 B2 * | 7/2012 | Cavanagh | F01N 3/2066 60/295 |
| 8,763,372 B2 * | 7/2014 | Pohl | F01N 3/2066 60/295 |
| 8,910,884 B2 * | 12/2014 | Thomas | F01N 3/28 239/124 |
| 2006/0013704 A1 | 1/2006 | Sawada et al. | |
| 2009/0282815 A1 | 11/2009 | Reinhold et al. | |

* cited by examiner

DOSING DEVICE

BACKGROUND OF THE INVENTION

The present invention relates to a dosing valve and to a dosing device for introducing a liquid medium into an exhaust gas stream of an internal combustion engine of a motor vehicle.

For internal combustion engines, compliance with pollutant emissions limits in the exhaust gas is legally required. Particularly in the case of a diesel vehicle, nitrogen oxide reduction is absolutely essential. One possibility for nitrogen oxide reduction is the known method of selective catalytic reduction (SCR), for example. In this method, a liquid reducing agent, e.g. an aqueous urea solution ("AdBlue"), is introduced into the exhaust gas stream in the exhaust pipe. With the hot exhaust gas, the aqueous urea solution is converted into gaseous ammonia, by means of which the toxic nitrogen oxide is reduced to form harmless water and nitrogen.

Pressure-wave-controlled dosing systems are known. In these systems, the injection valve consists exclusively of mechanical components. A valve needle is held shut by means of a spring holder and opens automatically above a certain hydraulic pressure. Injection is thus controlled by means of a pressure wave, which is produced with the aid of an external pump. One disadvantage is the low accuracy of metering since the injection quantity is heavily dependent on the shape of the pressure wave, which can easily be affected by external influences.

Patent Application DE 10 2011 078 852 A1, which is a post-publication, discloses another embodiment of a dosing valve, in which a pump and a nozzle are integrated in one unit. This integrated dosing module (IDM) does not have a return. The pump is designed in such a way that it also assumes the function of metering an accurate quantity of the liquid medium. This is achieved by virtue of the fact that the pump delivers in a purely volumetric way, with the result that a defined quantity of the medium is delivered with each delivery stroke. Very good metering accuracy is thereby achieved. One disadvantage in the system is the complex production thereof. Currently known embodiments contain a control edge, which must be set precisely, and a plurality of guides, which must be manufactured with an accurate fit relative to one another.

DE 10 2008 001 789 A1 shows a dosing device in which a dosing valve is controlled by an electromagnet. In this case, a flow rate of the aqueous urea solution when the valve is completely open is determined in accordance with a pressure of the aqueous urea solution. For this purpose, use is made of a characteristic which represents a relationship of the steady state flow rate against the pressure. This characteristic shows a relationship between the activation duration of the electromagnet and the injection quantity. The dosing of the aqueous urea solution is controlled by suitable activation of the valve.

SUMMARY OF THE INVENTION

The present invention differs from the prior art in that a pump sleeve is guided sealingly in one section of the stepped bore, in that a hollow-bored piston is guided sealingly in a central bore of the pump sleeve, in that a magnet sleeve is fastened to the housing in the low-pressure space, in that a stop sleeve is arranged on an opposite side of the low-pressure space from the magnet sleeve, and in that a stroke of the piston is limited by the magnet sleeve and/or by the stop sleeve.

A delivery volume of the dosing valve can be accurately determined by the defined limitation of the stroke of the piston. This results in a considerably improved metering accuracy of the dosing valve combined with simplified control. The dosing device according to the invention is of simple construction and inexpensive to produce and nevertheless operates very reliably.

In a preferred embodiment, it is envisaged that the stop sleeve is pressed into a magnet pot and that the magnet pot is connected to the housing. Rigid and accurate seating of the stop sleeve is thereby ensured; the magnet pot is preferably connected materially to the housing, e.g. by welding. This means that the axial position of the stop sleeve relative to the housing can be set during installation.

A length of the stop sleeve or the depth to which it is pressed into the magnet pot preferably determines the stroke of the piston and hence also the delivery volume of the dosing valve. Through an appropriately designed or press-fitted stop sleeve, it is thus possible to structurally define the delivery volume of the dosing valve and adapt it to different internal combustion engines and/or exhaust apparatus. The variation between different items within a series can also be greatly reduced. The construction of the dosing device can be standardized and is therefore suitable for large-scale manufacture. This is also the case especially because at least largely automated assembly is possible.

It is furthermore envisaged that the dosing valve has a pump working space in addition to the low-pressure space, wherein the low-pressure space and the pump working space are separated by a mechanical check valve. The particular effect of the check valve is that the pump working space can be automatically refilled in a simple manner by means of an excess pressure in the low-pressure space if there is an operational pressure drop in the pump working space. The first pressure space of the dosing valve after the pump in the direction of flow is preferably the low-pressure space.

Owing to the fact that an armature of the electromagnet is arranged in the low-pressure space and that the armature is connected to the piston, it is possible, on the one hand, to actuate the piston in a simple manner and, on the other hand, also to limit the stroke thereof in a simple manner.

The dosing device according to the invention is also distinguished by the fact that the pump sleeve projects with a pressure plate into a nozzle space and that a nozzle needle is arranged in the nozzle space, wherein the nozzle space is connected hydraulically to the pump working space by means of a transverse bore when the pressure plate is raised from a sealing edge of the housing. The pump sleeve—and hence also the pressure plate—is subjected to pressure at least indirectly by the movable piston when the electromagnet is activated. During this process, the medium situated in the pump working space is also subjected to pressure by the piston.

The nozzle space can be filled iteratively from the pump working space. Thus, when the electromagnet is activated, the nozzle space is filled with the liquid medium from the completely filled pump working space, and pressure is built up accordingly; when the energization of the electromagnet ends, the pump working space, which was previously at least partially emptied, is automatically fully refilled with liquid medium.

By virtue of its construction and of its design, the dosing device according to the invention, in particular the dosing valve, does not make any special demands on production technology. Thus, the guides, for example, do not have to be aligned with an accurate fit relative to one another and can thus be manufactured with a relatively large tolerance. All the guides can be ground in a single operation. The design does not contain any control edge or other functional elements which must be measured in the assembled state and then adjusted in the disassembled state. For this reason too, the dosing device according to the invention is inexpensive to produce.

It is also advantageous that the low-pressure space is connected hydraulically to the pump. Thus, a delivery pressure of the pump determines the pressure in the low-pressure space. In this case, the pump is preferably a pre-feed pump. The demands made on the pump, especially as regards a pressure buildup, are not particularly high. This also makes the dosing device inexpensive.

In one embodiment, it is envisaged that the dosing device according to the invention injects a liquid reducing agent, e.g. "AdBlue", for nitrogen oxide reduction into the exhaust gas stream. The dosing device according to the invention is thus part of a known system for selective catalytic reduction (SCR). In this case, the dosing valve is arranged ahead of an SCR catalyst in the direction of exhaust gas flow.

In another embodiment, provision is made as an alternative or in addition for the dosing device according to the invention to inject diesel fuel for particulate filter regeneration into the exhaust gas stream when required. The dosing device according to the invention is thus part of a known system for removing soot particles from the particulate filter of a diesel engine. For this purpose, the dosing valve is arranged upstream of an oxidation catalyst in the exhaust pipe.

BRIEF DESCRIPTION OF THE DRAWINGS

Further features, possible uses and advantages of the invention will become apparent from the following description of an illustrative embodiment of the invention, which is shown in the drawing. In this case, all the features described or shown, per se or in any combination, form the subject matter of the invention. In the drawings.

DETAILED DESCRIPTION

Figure 1:
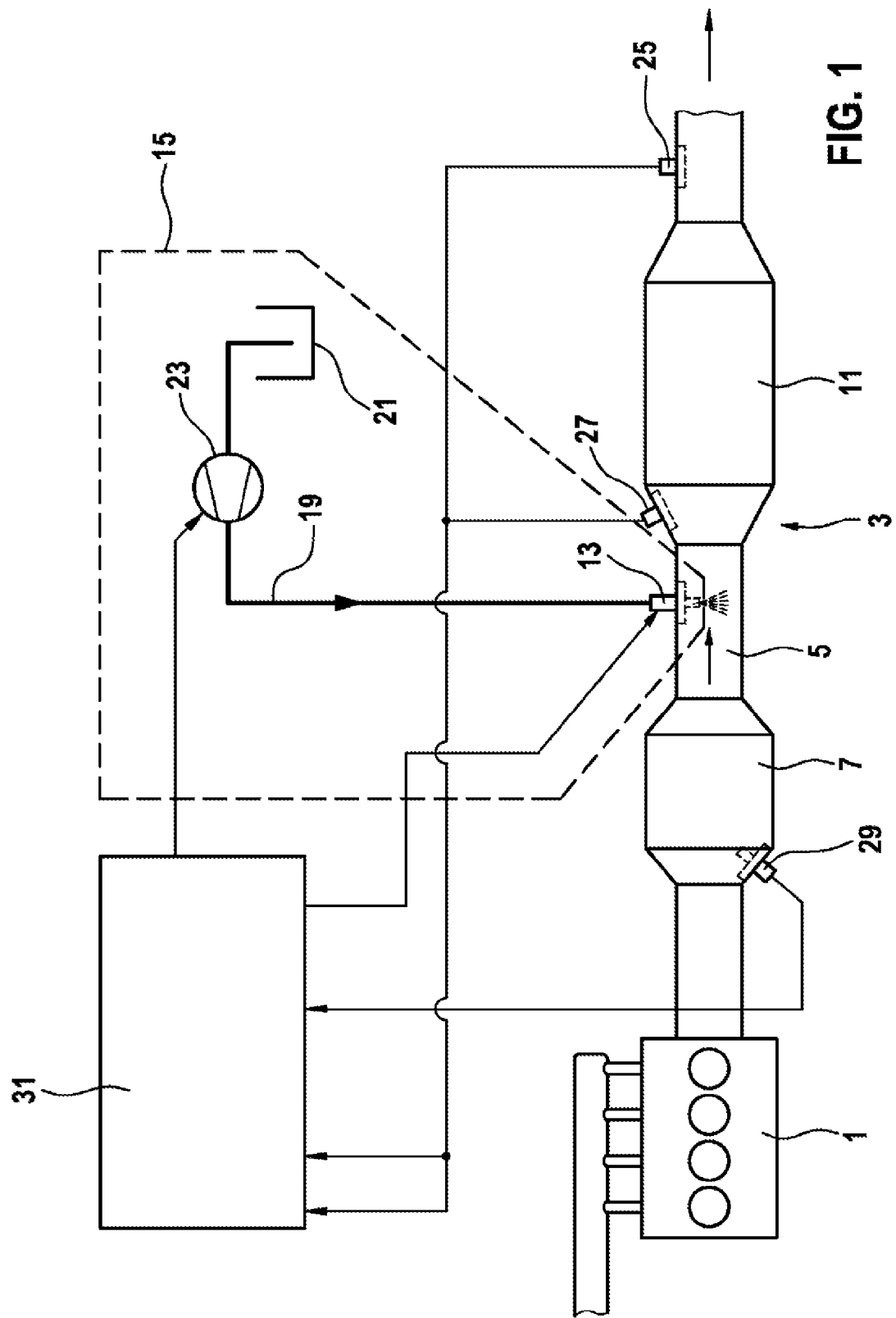
FIG. 1 shows the environment of the invention.

An internal combustion engine 1 having an exhaust gas aftertreatment device 3 is illustrated in a greatly simplified and schematic form in FIG. 1 and shows the environment to the invention. The exhaust gas aftertreatment device 3 comprises an exhaust pipe 5, an oxidation catalyst 7 and an SCR catalyst 11 for selective catalytic reduction of toxic nitrogen oxide. A particulate filter, which is usually arranged downstream of the oxidation catalyst 7, is not illustrated. The direction of flow of the exhaust gas through the exhaust pipe 5 is indicated by arrows (without reference signs).

In order to supply the SCR catalyst 11 with a liquid reducing agent, e.g. an aqueous urea solution ("AdBlue") or some other liquid reducing agent, a dosing valve 13 for introducing the aqueous urea solution is arranged on the exhaust pipe 5 upstream of the SCR catalyst 11. The dosing valve 13 injects the aqueous urea solution into the exhaust pipe 5 upstream of the SCR catalyst 11 when required, e.g. when a high concentration of nitrogen oxides is detected in the exhaust gas. With the hot exhaust gas, the aqueous urea solution is converted into gaseous ammonia, by means of which the toxic nitrogen oxide is reduced to form harmless water and nitrogen in the SCR catalyst 11.

The dosing valve 13 is part of a dosing device 15. The dosing device 15 furthermore comprises a pump 23, preferably a pre-feed pump, which is arranged in a delivery line 19 between a storage tank 21 and the dosing valve 13. The delivery line 19 supplies the dosing valve 13 with aqueous urea solution from the storage tank 21.

For the sake of completeness, attention is also drawn to sensors arranged in the exhaust gas aftertreatment device 3, namely a nitrogen oxide sensor 25 and temperature sensors 27 and 29. However, the sensors 25, 27 and 29 shown here represent only an illustrative selection since, in real exhaust gas aftertreatment devices 3, even more sensors can be arranged in the region of the exhaust pipe 5.

The sensors 25, 27 and 29 and the pre-feed pump 23 and the dosing valve 13 are connected to a control unit 31 by signal lines (without reference signs). The control unit 31 can also comprise a plurality of control units and control units arranged in a distributed manner.

Figure 2:
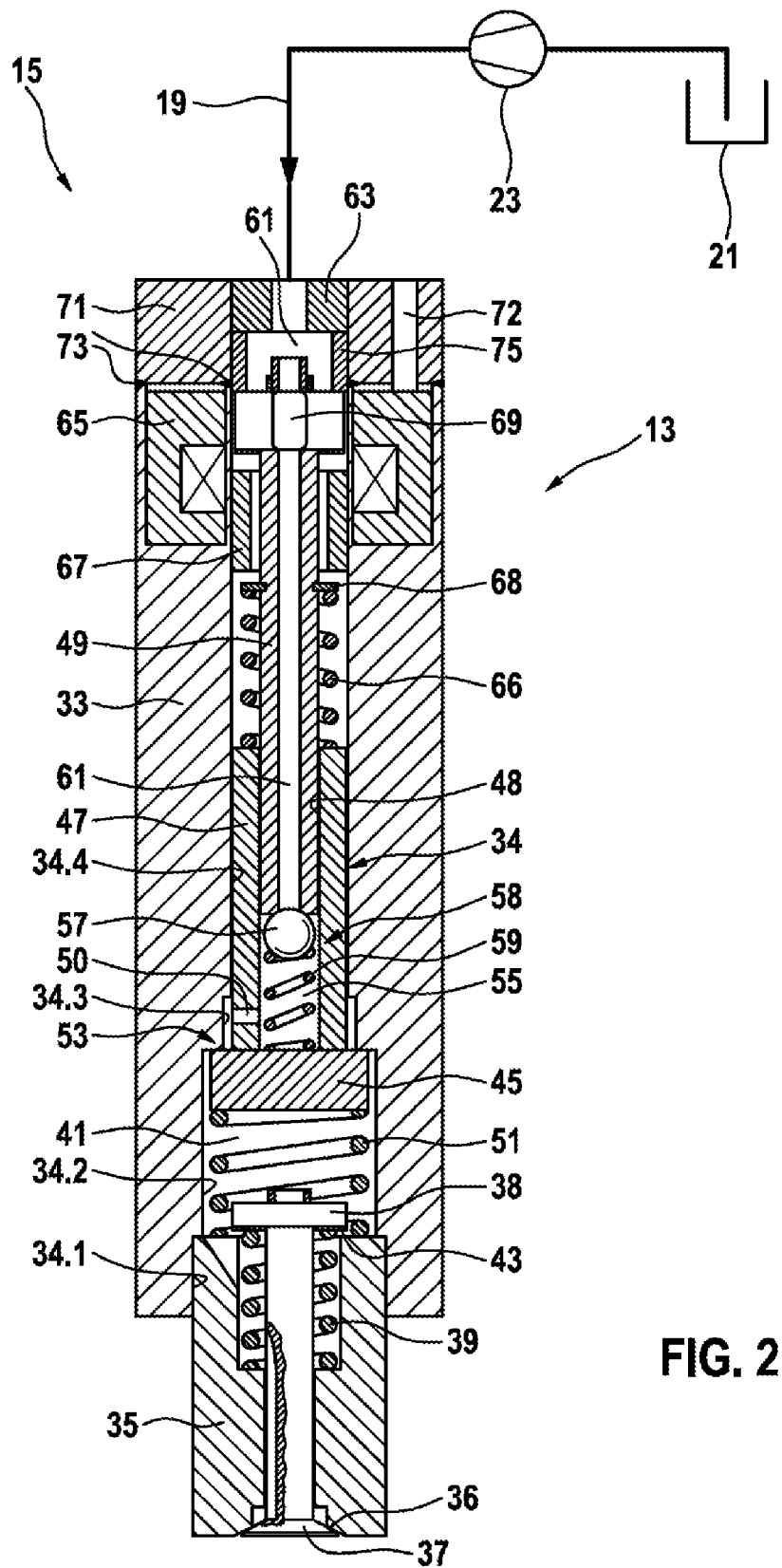
FIG. 2 shows an illustrative dosing device according to the invention in detail.

FIG. 2 shows the dosing device 15 according to the invention, in particular the dosing valve 13, in detail. The dosing valve 13 is surrounded by a housing 33, from which a nozzle body 35 projects.

In the housing 33 there is a stepped bore 34 having a plurality of sections 34.1 to 34.4. The nozzle body 35 is press fitted in the first section 34.1 of the stepped bore 34.

The second section 34.2 of the stepped bore 34 delimits a nozzle space 41, in which there are, inter alia, a pressure plate 45 and a first compression spring 51.

A pump sleeve 47 is guided sealingly and yet with the ability for axial movement in the fourth section 34.4 of the stepped bore 34.

A magnet sleeve 67 is press fitted at the top end of the fourth section 34.4 in FIG. 2. Together with an armature 69, the magnet sleeve 67 also serves as an end stop for a piston 49. The armature 69 is firmly connected to the piston 49. Grooves (without reference signs) or longitudinal bores, which establish a hydraulic connection between those parts of the low-pressure space 61 which are "separated" from the magnet sleeve 67, are machined into the magnet sleeve 67.

An outward-opening nozzle needle 37 is guided in the nozzle body 35. Through the spring force of a nozzle closing spring 39, the nozzle needle 37 closes the nozzle body 35 in a valve seat 36. The nozzle closing spring 39 is supported at one end against the nozzle body 35 and at the other end against stop 38 on the nozzle needle 37.

The nozzle needle 37 opens when the pressure in a nozzle space 41 is so great that the hydraulic forces acting on the nozzle needle 37 are greater than the forces of the nozzle closing spring 39 acting on the nozzle needle 37 in the closing direction.

To set the stroke of the nozzle needle 37, a stroke setting washer 43 can be arranged between the stop 38 and the nozzle body 35.

In the closed position illustrated in FIG. 2, the nozzle needle 41 is closed by the pressure plate 45 at an opposite end of the nozzle space 41 from the stop 38.

The pressure plate 45 is part of a pump sleeve 47, which is guided in an axially movable manner in the fourth section 34.4 of the stepped bore 34 of the housing 33. The pump sleeve 47 has a central bore 48, in which the piston 49 is guided. The piston 49 is bored hollow. Moreover, a check valve 58 comprising a valve member 57, which is designed as a ball, and a second compression spring 59, as well as a return spring 66 are arranged in the central bore 48. In this case, the valve member 57 is pressed against the opening of the hollow-bored piston 49 by the second compression spring 59.

The central bore 48, the valve member 57 and the pressure plate 45 delimit a pump working space 55. A transverse bore 50, which connects the pump working space 55 to the third section 34.3 of the stepped bore 34, is arranged in the pump sleeve 47.

The cavity in the piston 49 forms a low-pressure space 61 of the dosing valve 13, wherein the low-pressure space 61 is connected to the delivery line 19 by a hydraulic connection 63. It is therefore the delivery pressure produced by the pump 23 which prevails in the low-pressure space 61.

The hydraulic connection 63 is a separate component, which is inserted sealingly into a central bore (without a reference sign) of the magnet pot 71 and is fixed there. This can be accomplished by means of a press fit or a welded joint or some other joining method, for example. The hydraulic connection 63 is connected hydraulically to the delivery line 19.

The piston 49 is moved out of the closed position illustrated (downward in FIG. 2) by energizing an electromagnet 65 and thus serves as a pump piston. The energization of the electromagnet 65 is controlled by the control unit 31. The electromagnet 65 operates against a force of the return spring 66, which is arranged coaxially with the piston 49. At one end, the return spring 66 rests against an upper edge of the pump sleeve 47 and, at the other end, rests against a snap ring 68 arranged on the piston 49.

The electromagnet 65 is recessed in the housing 33 of the dosing valve 13 at an end opposite the nozzle body 35. For electromagnetic actuation, the armature 69 is arranged on the piston 49, being guided in the fourth section 34.4 of the stepped bore 34 of the housing 33. The fourth section 34.4 has a diameter larger than the diameter of the piston 49.

The electromagnet 65 is covered by a magnet pot 71, wherein the magnet pot 71 simultaneously also closes the dosing valve 13 with respect to the delivery line 19 with the hydraulic connection 63. An electric terminal 72 for the electromagnet 65 is provided in the magnet pot 71. The magnet pot 71 is connected to the housing 33 by weld seams 73.

In the closed position illustrated in FIG. 2, a stop sleeve 75 inserted into the central bore (without a reference sign) of the magnet pot 71 serves as a stop for the armature 69. In this case, the stop sleeve 75 and the position of the hydraulic connection 63 in the central bore of the magnet pot limit the stroke motion of the piston 49. By means of the length of the stop sleeve 75 but also the installation depth of the hydraulic connection 63 in the magnet pot 75, it is possible during assembly to set a volume of the low-pressure space 61 and a stroke of the piston 49 and hence the desired delivery volume of the dosing valve 13. It is thereby possible to compensate for manufacturing tolerances in the other components, ensuring that all items in a series have the same delivery volume for each piston stroke.

The dosing device 15 according to the invention has the special feature that, with the exception of the electromagnet 65 and of the magnet pot 72 with the hydraulic connection 63, all the components can be inserted from "below" into the housing 33. Here, "below" refers to the orientation of the dosing device 15 illustrated in FIG. 2.

This capacity for assembly from one side is an important production advantage because it facilitates automation of assembly or makes it possible for the first time.

The dosing valve 13 functions as follows:

The dosing valve 13 is supplied with aqueous urea solution from the storage tank 21 via the delivery line 19. In the process, the aqueous urea solution flows at the delivery pressure of the pump 23 into the low-pressure space 61 of the dosing valve 13.

In the initial state illustrated in FIG. 2, the piston 49 is in an upper end position and rests against the stop sleeve 75. If the electromagnet 65 is energized, a magnetic force acts on the armature 69 via the magnet sleeve 67. As a consequence thereof, the piston 49 moves in the direction of the nozzle body 35. As a result, the pressure in the pump working space 55 rises until the pump sleeve 47 and, with it, the pressure plate 45 likewise move in the direction of the nozzle body 35. During this process, a sealing edge 53 between the housing 33 and the pump sleeve 47 is opened.

The aqueous urea solution is forced into the nozzle space 41 by the piston 49 and the valve member 57, with the result that the pressure likewise rises there. As soon as the hydraulic forces resulting from the pressure in the nozzle space 41 and acting on the nozzle needle 37 exceed the spring force of the nozzle closing spring 39, the nozzle needle 37 opens.

After the end of energization, the piston 49 moves upward in the direction of its initial position through the spring force of the return spring 66. During this process, the pressure in the pump working space 55 falls. The nozzle needle 37 is closed due to the spring force of the nozzle closing spring 39, and the sealing edge 53 closes due to the spring force of the first compression spring 51.

If the pressure level of the low-pressure space 61 is undershot in the pump working space 55, the ball 57 of the check valve 58 opens the low-pressure space 61. In this way, the pump working space 55 can be refilled via the central bore in the piston 49, the transverse bore 50 in the pump sleeve 47 and section 34.3 of the stepped bore 34 until the ball 57 of the check valve 58 closes the low-pressure space 61. This occurs as soon as the pressure in the pump working space 55 is equal to the pressure in the low-pressure space 61. The filling of the pump working space 55 is thus complete.

The spring force of the nozzle closing spring 39 is advantageously chosen in such a way that the pressure level in the nozzle space 41 as the nozzle needle 37 opens is significantly above the pressure level in the low-pressure space 61. The pressure level prevailing there is based on the delivery pressure of the pump 23. In the unactivated state, the nozzle needle 37 is thus always held shut with a sufficiently high closing force.

The delivery volume of the dosing valve 13 results, on the one hand, from the upper end position of the body 49 against the stop on the stop sleeve 75 and, on the other hand, from the lower end position against the stop on the magnet sleeve 67. Through variation of its length or of the depth to which it is pressed in, the stop sleeve 75 is suitable for setting the stroke of the piston 49 and hence for setting the delivery volume (injection quantity) of the dosing valve 13.

In an embodiment which is not illustrated, the storage tank 21 can be filled with diesel fuel. The dosing device 15 can thus be used to regenerate a particulate filter in the exhaust pipe 5.

Particularly in the case of larger diesel engines, a burner is provided upstream of the particulate filter and of the oxidation catalyst 7, for example, producing a flame when required that serves to evaporate the fuel additionally injected into the exhaust gas. This exhaust gas/fuel mixture reacts in a highly exothermic way in the oxidation catalyst 7. As a consequence thereof, the exhaust gas reaches the high temperature required to regenerate the particulate filter. For this purpose, the dosing valve 13 is arranged upstream of the oxidation catalyst 7 in the exhaust pipe 5. This embodiment can be installed as an addition or as an alternative for the purpose of injecting an aqueous urea solution upstream of the SCR catalyst 11.

The invention claimed is:

1. A dosing valve (13) comprising:
   a housing (33), wherein a stepped bore (34) is formed in the housing (33), and wherein the stepped bore (34) delimits a low-pressure space (61),
   an electromagnet (65);
   a pump sleeve (47) guided sealingly in one section (34.4) of the stepped bore (34);

a hollow-bored piston (49) guided sealingly in a central bore (48) of the pump sleeve (47);

a magnet sleeve (67) fastened to the housing (33) in the low-pressure space (61); and a stop sleeve (75) arranged on an opposite side of the low-pressure space (61) from the magnet sleeve (67), wherein a stroke of the piston (49) is limited by at least one of the magnet sleeve (67) and the stop sleeve (75).

2. The dosing valve (13) as claimed in claim 1, wherein the stop sleeve (75) is inserted into a bore in a magnet pot (71) connected to the housing (33), and in that a hydraulic connection (63) is connected sealingly and firmly in the bore to the magnet pot (75).

3. The dosing valve (13) as claimed in claim 1, wherein the dosing valve (13) has a pump working space (55) in addition to the low-pressure space (61), and in that the low-pressure space (61) and the pump working space (55) are separated by a check valve (58, 57, 59).

4. The dosing valve (13) as claimed in claim 3, wherein an armature (69) of the electromagnet (65) is arranged in the low-pressure space (61), and in that the armature (69) is connected to the piston (49).

5. The dosing valve (13) as claimed in claim 4, wherein the pump sleeve (47) projects with a pressure plate (45) into a nozzle space (41).

6. The dosing valve (13) as claimed in claim 5, wherein a nozzle needle (37) is arranged in the nozzle space (41), and in that the nozzle space (41) is connected hydraulically to the pump working space (55) by means of a transverse bore (50) when the pressure plate (45) is raised from a sealing edge (53) of the housing (33).

7. The dosing valve (13) as claimed in claim 3, wherein a medium in the pump working space (55) is subjected to pressure by the piston (49).

8. The dosing valve (13) as claimed in claim 1, wherein the low-pressure space (61) is connected hydraulically to a pump (23).

9. The dosing valve (13) as claimed in claim 1, wherein the dosing valve is constructed such that installation of all components (75, 69, 47, 68, 66, 57, 59, 45, 51, 38, 37, 35) of the dosing valve arranged in the stepped bore (34, 34.1, 34.2, 34.3, 34.4) can take place from one end of the housing (33).

10. The dosing valve (13) as claimed in claim 2, wherein a stroke of the piston (49) is limited by at least one of a length and a positioning of the hydraulic connection (63) in the magnet pot (75).

11. The dosing valve (13) as claimed in claim 2, wherein a stroke of the piston (49) is limited by a length of the stop sleeve (75).

12. A dosing device (15) for introducing a liquid medium into an exhaust gas stream of an internal combustion engine (1) of a motor vehicle, comprising a pump (23) for delivering the liquid medium, and a delivery line (19) between a storage tank (21) and a dosing valve (13) as claimed in claim 1.

13. The dosing device (15) as claimed in claim 12, wherein the dosing device (15) injects a liquid reducing agent for nitrogen oxide reduction into the exhaust gas stream.

14. The dosing device (15) as claimed in claim 12, wherein the dosing device (15) injects diesel fuel for particulate filter regeneration into the exhaust gas stream.

15. The dosing valve (13) as claimed in claim 1, wherein the stroke of the piston (49) is limited by both the magnet sleeve (67) and the stop sleeve (75).

16. The dosing valve (13) as claimed in claim 2, wherein a stroke of the piston (49) is limited by both a length and a positioning of the hydraulic connection (63) in the magnet pot (75).

* * * * *